(No Model.)
H. COMSTOCK.
ARTIFICIAL BAIT.
No. 271,424. Patented Jan. 30, 1883.
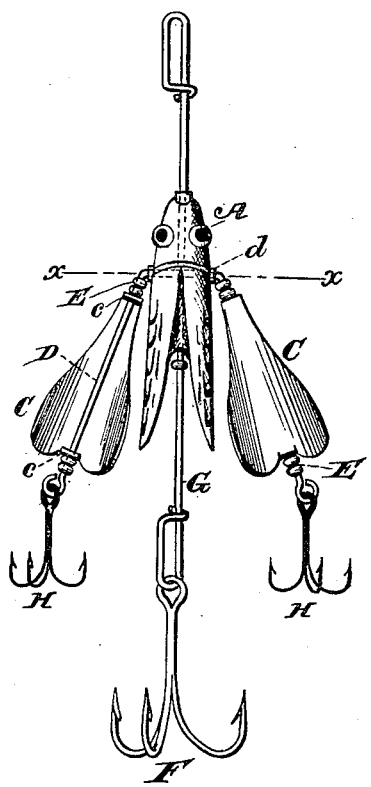
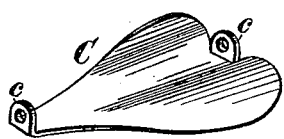
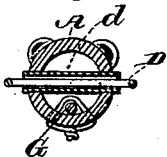
Witnesses.
Robert Everett.
J. A. Rutherford
Inventor:
Harry Comstock.
By James L. Norris.
Atty.

UNITED STATES PATENT OFFICE.

HARRY COMSTOCK, OF FULTON, NEW YORK.

ARTIFICIAL BAIT.

SPECIFICATION forming part of Letters Patent No. 271,424, dated January 30, 1883.

Application filed November 25, 1882. (No model.)

*To all whom it may concern:*

Be it known that I, HARRY COMSTOCK, a citizen of the United States, residing at Fulton, Oswego county, New York, have invented new and useful Improvements in Artificial Bait, of which the following is a specification.

This invention relates to artificial bait for fishing purposes, and has for its object to provide an artificial insect or fish bait which shall have a natural and animated appearance while being drawn through the water.

Heretofore spoon-baits have been adapted to revolve around a rod connected with the hook, and, as is well known, a variety of artificial fish and insects have been produced for catching fish.

My improvement consists in producing the artificial fish or insect with fins or wings, each having an independent and substantially axial rotation, so that as the bait is drawn through the water its fins or wings shall, by their free and rapid rotation, give a highly animated appearance to the artificial fish or insect, and thereby tempt the fish to take the bait.

In the drawings, Figure 1 represents my improved artificial bait with its hooks. Fig. 2 is a perspective view of one of the rotary fins or wings. Fig. 3 is a transverse section taken through the bait on the line $x\ x$.

A indicates the body of the bait, which may be that of a fish or insect, as preferred, and C C indicate the rotary fins or wings, one of which is located on each side of the body of the bait. In the present instance the bait is an artificial insect provided with rotary wings, supported on the two arms of a rod, D, which is passed transversely through the body of the insect near its head, and then bent back into nearly U form, so as to form the two arms which project out from the body at acute angles thereto. A tube, $d$, is inserted in the body of the insect and middle portion of the rod, fitted to turn in said tube, which forms a bearing for the rod and prevents wear of the body of the bait. The wings are made on the principle of a propeller-blade, so that when they are drawn through the water they will readily turn about the rod on which they are loosely fitted. In the present instance each wing is composed of a metal or other plate shaped like an elongated heart, having its two halves made concavo-convex from end to end, or nearly so, with the concavities on opposite sides. Portions of this plate are turned up at its ends to form ears or bearings $c$ for the rod, which passes through said bearings, and suitable anti-friction stops, E, are fitted on the rods at the ends of the wing, so as to admit of the same working freely. The hook or hooks F are connected with a rod, G, which passes longitudinally through the body of the bait, and has at its upper end an eye for connecting it with the line. The insect or fish is free to turn about said rod, and, if desired, can have a limiting sliding movement thereon. The rod which carries the rotary wings or fins is free to turn in its bearing in the body of the bait, so that the wings or blades can swing, and thus adjust themselves as they are moved along in the water.

If preferred, the hooks H can be attached to ends of rod D, projecting slightly beyond the outer larger ends of the fins or wings of the bait.

By the above arrangement each wing is free to turn independently about the arm on which it is supported, so that while the wings are capable of an independent substantially axial rotation, both are free to turn with the body of the bait around the rod G, to which the hook and line are attached. The bait will therefore have a highly animated appearance while being drawn through the water, and thereby prove very attractive to the fish.

Having thus described my invention, what I claim is—

1. An artificial bait for fishing, consisting of an artificial fish or insect having independently-rotating fins or wings, substantially as described.

2. An artificial fish or insect having fins or wings supported to turn upon the arms of a rod extending out from the sides of the insect or fish, substantially as described.

3. An artificial fish or insect provided with a rod passing transversely through its body, and having its projecting ends bent back with fins or wings fitted to turn upon said arms, substantially as described.

4. The combination, with a rod to which the line and hook are connected, of an artificial fish or insect fitted to turn on said rod, and provided with swinging and independently-rotary fins or wings, substantially as described.

In testimony whereof I have hereunto set my hand in the presence of two subscribing witnesses.

HARRY COMSTOCK.

Witnesses:
E. C. PFAFFLE,
T. S. MILLEN.